3,435,063
FLUORINATED CYCLIC KETO ESTERS
Hans Machleidt, Biberman, and Valentin Hartmann, Riehen, Germany, assignors, by mesne assignments, to E. R. Squibb & Sons, Inc., New York, N.Y., a corporation of Delaware
No Drawing. Filed Feb. 25, 1965, Ser. No. 436,720
Int. Cl. C07c 69/74, 67/00, 69/62
U.S. Cl. 260—468      10 Claims

ABSTRACT OF THE DISCLOSURE

The invention relates to fluorinated cyclic keto esters of the formula

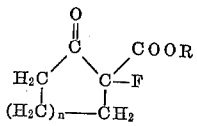

wherein R is lower alkyl and $n$ is 1 to 3, compounds useful as intermediates.

---

This invention relates to fluorinated cyclic keto esters. More particularly the invention relates to compounds of the formula (I) 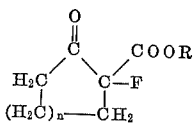

R in Formula I represents lower alkyl, e.g., straight and branched chain groups such as methyl, ethyl, propyl, isopropyl and the like, and $n$ is 1, 2 or 3. Stereoisomeric forms are all within the scope of this invention.

These compounds are produced by fluorinating, e.g., with perchloryl fluoride, a compound of the formula (II) 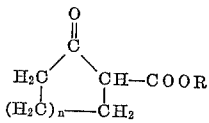

The reaction is preferably effected in a lower alkanol such as ethanol, preferably in the form of an alkali metal alkoxide, at a low temperature below about 0° C., e.g., at −15°, down to about −40° C.

The new compounds of this invention are useful as intermediates for the production of acyclic fluorinated acids and esters of the formula (III)   ROOC—CH$_2$—(CH$_2$)$_n$—CH$_2$—CH(F)COOR e.g., α-fluoroadipic acid, which are produced by treatment of I with a base or RO⁻, as well as other fluorinated cyclic ketones. The new compounds of this invention are also useful as antimetabolites, e.g., for the lowering of blood cholesterol by the inhibition of the formation of that substance. They may be administered orally or parenterally by incorporating a therapeutically effective dose in conventional dosage forms such as tablets, capsules, injectables along with vehicles, excipients, preservatives or the like according to accepted pharmaceutical practice.

The following examples are illustrative of the invention, all temperatures being on the centigrade scale.

EXAMPLE 1

2-fluorocyclopentanone-2-carboxylic acid ethyl ester 156 g. (1 mol) of cyclopentanone-2-carboxylic acid ethyl ester in a solution of 27.6 g. (1.2 gram atom) of sodium in 1.8 l. of absolute ethanol is treated with 133 g. (1.3 mol) of perchloric fluoride in a four necked flask with a gas inlet, thermometer and stirrer while cooling to −30° (inner temperature not above −4°). The fluorination is followed by gas chromatography. The 2-fluorocyclopentanone-2-carboxylic acid ethyl ester, upon prolonged contact with the reaction mixture, shows a neutral reaction and no enol reaction when tested with ferric chloride so that upon separation of the precipitated sodium chlorate by suction filtration and working up the product, α-fluoroadipic acid diethyl ester is obtained.

EXAMPLE 2

2-fluorocyclohexanone-2-carboxylic acid ethyl ester 76.7 g. (0.45 mol) of cyclohexanone-2-carboxylic acid ester in a solution of 12.4 g. (0.54 gram atom) of sodium in 3.2 l. of absolute ethanol is treated with 57 g. (0.56 mol) of perchloryl fluoride with cooling as in Example 1. The precipitated sodium chlorate is separated by suction filtration and the filtrate is concentrated under vacuum, water is added and then shaken with chloroform, washed with water and dried over magnesium sulfate. After evaporating the product under vacuum, 187 g. of 2-fluorocyclohexanone-2-carboxylic acid ethyl esters are obtained, B.P. 74–78°.

EXAMPLE 3

2-fluorocycloheptanone-2-carboxylic acid ethyl ester

To a suspension of 80 g. of dry aluminum trichloride in 1 l. of absolute ether are added dropwise with stirring 98 g. (1 mol) of cyclohexanone in 1 l. of absolute ether and then 200 g. of diazoacetic ester in 1 l. of absolute ether over a period of 2.5 hours. After adding an excess of potassium bicarbonate solution, stirring with Celite 535 and filtering under suction, the filtrate is washed with ether, acidified, shaken again with ether and washed. After distilling off the solvent and fractionating the residue, 80.3 g. (44%) of cycloheptanone-2-carboxylic acid ethyl ester, B.P. 65–67° are obtained.

136 g. (0.74 mol) of cycloheptanone-2-carboxylic acid ethyl ester, obtained as described above, in a solution of 20.4 g. (0.89 gram atom) of sodium in 3.7 l. of absolute ethanol are treated with 100 g. (0.98 mol) of perchloryl fluoride. After working up as in Example 2 and distillation in a Vigreux column, 96.6 g. of 2-fluorocycloheptanone-2-carboxylic acid ethyl ester, B.P. 60–64° are obtained.

EXAMPLE 4

α-Fluoropimelic acid diethyl ester 3.76 g. (0.2 mol) of 2-fluorocyclohexanone-2-carboxylic acid ethyl ester in a solution of 920 mg. (0.04 gram atom) of sodium in 280 ml. of absolute ethanol are heated under reflux for 25 hours. Addition of water, neutralization with acetic acid and working up yield 24.1 g. (52%) of α-fluoropimelic acid diethyl ester, B.P. 74–76°.

EXAMPLE 5

2-fluorocyclohexanone 37.6 g. (0.20 mol) of 2-fluorocyclohexanone-2-carboxylic acid ethyl ester are treated with a solution of 13.4 g. (0.24 mol) of potassium hydroxide in 200 ml. of water and 300 ml. of methanol for two hours. The mixture is extracted with 3×50 ml. of petroleum ether and the methanol is distilled off under vacuum. 100 ml. of 5 N sulfuric acid are added and after the end of carbon dioxide evolution is extracted with chloroform. The chloroform phase is concentrated and distilled to obtain 18.9 g. (82%) of 2-fluorocyclohexanone, B.P. 73–75°.

EXAMPLE 6

2-fluorocycloheptanone 36.4 g. (0.18 mol) of 2-fluorocycloheptanone-2-carboxylic acid ethyl ester are treated for two hours with a solution of 12.1 g. (0.22 mol) of potassium hydroxide in 100 ml. of water and 250 ml. of methanol. Extraction with 3×50 ml. of petroleum ether yields 4.7 g. of oil. Distilling off the methanol under vacuum, addition of 110 ml. of 4 N sulfuric acid ($CO_2$ evolution), extraction with chloroform and distillation of the combined neutral fractions yields 18.7 g. (80%) of 2-fluorocycloheptanone, B.P. 31–33°.

What is claimed is:

1. A compound of the formula

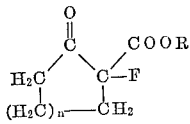

wherein R is lower alkyl and $n$ is an integer from 1 to 3.
2. 2-fluorocyclopentanone-2-carboxylic acid lower alkyl ester.
3. 2-fluorocyclopentanone-2-carboxylic acid ethyl ester.
4. 2-fluorocyclohexanone-2-carboxylic acid lower alkyl ester.
5. 2-fluorocyclohexanone-2-carboxylic acid ethyl ester.
6. 2-fluorocycloheptanone-2-carboxylic acid lower alkyl ester.
7. 2-fluorocycloheptanone-2-carboxylic acid ethyl ester.
8. A process for the production of a compound of claim 1 which comprises fluorinating with perchloryl fluoride at a temperature below about 0° C. a compound of the formula

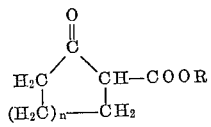

wherein R is lower alkyl and $n$ is an integer from 1 to 3.
9. A process as in claim 8 wherein cyclohexanone-2-carboxylic acid ethyl ester is fluorinated to obtain 2-fluorocyclohexanone-2-carboxylic acid ethyl ester.
10. A process as in claim 8 wherein cycloheptanone-2-carboxylic acid ethyl ester is fluorinated to obtain 2-fluorocycloheptanone-2-carboxylic acid ethyl ester.

References Cited

UNITED STATES PATENTS 3,165,538   1/1965   Lafont et al. _____ 260—346.3

OTHER REFERENCES

Inman C. E. et al., J. Am. Chem. Soc. 80, 6533-5 (1958).

LORRAINE A. WEINBERGER, *Primary Examiner.*

PAUL J. KILLOS, *Assistant Examiner.*

U.S. Cl. X.R.

260—485, 537, 999